(12) United States Patent
Francois et al.

(10) Patent No.: US 8,275,037 B2
(45) Date of Patent: Sep. 25, 2012

(54) SIMPLIFIED INTER-LAYER MOTION PREDICTION FOR SCALABLE VIDEO CODING

(75) Inventors: Edouard Francois, Bourg des Comptes (FR); Vincent Bottreau, Chateaubourg (FR); Jérome Vieron, Bedee (FR); Christophe Chevance, Brece (FR)

(73) Assignee: Thomson Licensing, Issy les Moulineaux (FR)

( * ) Notice: Subject to any disclaimer, the term of this patent is extended or adjusted under 35 U.S.C. 154(b) by 792 days.

(21) Appl. No.: 12/227,046

(22) PCT Filed: Apr. 26, 2007

(86) PCT No.: PCT/EP2007/054108
§ 371 (c)(1),
(2), (4) Date: Nov. 5, 2008

(87) PCT Pub. No.: WO2007/128706
PCT Pub. Date: Nov. 15, 2007

(65) Prior Publication Data
US 2009/0103615 A1    Apr. 23, 2009

(30) Foreign Application Priority Data
May 5, 2006 (EP) .................................. 06290747

(51) Int. Cl.
*H04N 7/12* (2006.01)
(52) U.S. Cl. ......... 375/240.12; 375/240.16; 375/240.24; 375/240.26
(58) Field of Classification Search ............. 375/240.12, 375/240.16, 240.24, 240.26; 380/200
See application file for complete search history.

(56) References Cited

U.S. PATENT DOCUMENTS 7,899,115 B2 *   3/2011   Jeon et al. .................. 375/240.1
2005/0226335 A1   10/2005   Lee et al.
(Continued)

FOREIGN PATENT DOCUMENTS
JP      2005304035 A      10/2005
(Continued)

OTHER PUBLICATIONS

T. Wiegand et al: "Joint Scalable Video Model JSVM-6: Joint Draft 6 with proposed changes" Joint Video Team of ISO/IEC MPEG and ITU-T VCEG (ISOIEC JTC1/SC29/WG11 and ITU-T SG16 Q6), Apr. 1, 2006, pp. I-XVI, 18-36, 349-355, XP002456513.

(Continued)

*Primary Examiner* — Thanhnga B Truong
(74) *Attorney, Agent, or Firm* — Robert D. Shedd; Jeffrey M. Navon (57) ABSTRACT

Methods for determining for high layer macroblocks that use inter-layer prediction, a partitioning of the macroblock. The methods include dividing the high layer macroblock in non-overlapping high layer blocks of a predefined size; determining a corresponding base layer pixel for one pixel, called reference pixel, of each high layer block; identifying, for each reference pixel, a base layer macroblock to which the corresponding base layer pixel belongs, a base layer partition to which the corresponding base layer pixel belongs in the identified base layer macroblock, a base layer sub-partition to which the corresponding base layer pixel belongs in the identified base layer partition if the sub-partition exists; deriving, for each of the high layer block, a single value, called PartInfo value; and determining a partitioning of the high layer macroblock in macroblock partitions by comparing between them the PartInfo values associated with each of the high layer blocks.

8 Claims, 4 Drawing Sheets

U.S. PATENT DOCUMENTS

2006/0008007 A1    1/2006   Olivier et al.
2008/0267291 A1    10/2008   Vieron et al.

FOREIGN PATENT DOCUMENTS

JP      2006025429 A    1/2006
JP      2008530926 A    10/2008

OTHER PUBLICATIONS

T. Wiegand et al: "Joint Scalable Video Model JSVM-5: Joint Draft 5 with proposed changes" Joint Video Team of ISO/IEC MPEG and ITU-T VCEG (ISOIEC JTC1/SC29/WG11 and ITU-T SG16 Q6), Jan. 14, 2006, pp. I-XV, 18-36, 348-361, XP002456514.

J. Vieron et al: "CEIO: Unified motion upsampling in extended spatial scalability" Joint Video Team of ISO/IEC JTC1/SC29/WG11 and ITU-T SG16 Q6, Aug. 2, 2005, XP030006061.

J. Vieron et al: "Joint Scalable Video Model JSVM-5" Joint Video Team of ISO/IEC JTC1/SC29/WG11 and ITU-T SG16 Q6, Jan. 14, 2006, pp. 1-43, XP002401348.

Search Report Dated Oct. 25, 2007.

Wiegand, et. al., Joint Scalable Video Model JSVM 5 Joint Draft 5 with Proposed Changes, 2006 Joint Video Team of ISO/IEC MPEG & ITU-T VCEG, Bangkok, Thailand.

\* cited by examiner high spatial layer        Base spatial layer

SIMPLIFIED INTER-LAYER MOTION PREDICTION FOR SCALABLE VIDEO CODING

This application claims the benefit, under 35 U.S.C. §365 of International Application PCT/EP2007/054108, filed Apr. 26, 2007, which was published in accordance with PCT Article 21(2) on Nov. 15, 2007 in French and which claims the benefit of European patent application No. 06290747.2, filed on May 5, 2006.

The invention relates to scalable video coding (SVC), more specifically on inter-layer motion prediction used in SVC standard being defined by the Joint Video Team (JVT) of ISO/IEC MPEG & ITU-T VCEG.

State-of-art scalable hierarchical coding methods allow to encode the information hierarchically in order that it can be decoded at different resolution and/or quality levels. A data stream generated by a scalable coding device is thus divided into several layers, a base layer and one or more enhancement layers. These devices allow to adapt a unique data stream to variable transmission conditions (bandwidth, error rate . . . ) and also to the capacities of reception devices (CPU, characteristics of reproduction device . . . ). A spatially scalable hierarchical encoding (or decoding) method encodes (or decodes) a first part of data called base layer relating to low resolution images, and from this base layer encodes (or decodes) at least another data part called enhancement layer relating to high resolution images. The coding information relating to enhancement layer are possibly inherited (i.e. derived) from coding information relating to the base layer by a method called inter-layer inheriting method. The derived coding information may possibly comprise: a partitioning pattern associated to block of pixels of the high resolution image (for splitting said block into several sub-blocks), coding modes associated to said blocks, possibly motion vectors and one or more image reference indices associated to some blocks allowing to reference the image used to predict said block. A reference image is an image of the sequence used to predict another image of the sequence. Thus, if not explicitly coded in the data stream, the coding information (more specifically, macroblock type and sub-macroblock types) relating to the enhancement layer has to be derived from the coding information relating to low resolution images. State-of-art methods for deriving coding information can be used for high resolution images whose format is not linked to the format of low resolution images by a dyadic transform. The most recent method, as described in the document from the Joint Video Team (JVT) of ISO/IEC MPEG & ITU-T VCEG JVT-R202 entitled "Joint Scalable Video Model JSVM-5: Joint Draft 5 with proposed changes", J. Reichel, H. Schwarz, M. Wien (denoted in the sequel JSVM5), proposes a direct inter-layer motion prediction method, based on some complex (in terms of textual description) processes.

It is an object of the invention to simplify significantly this inter-layer motion prediction process and its description. More specifically, the invention relates to a process for determining the partitioning of said macroblock in partitions and possibly the partitioning of said partitions in sub-partitions. It is another object of the invention to derive macroblock type and sub-macroblock types, for a given high layer macroblock, using inter-layer prediction, according to claim 1.

Other particularities and advantages of the invention will become clearly apparent from the following description given by way of non limiting examples and given in light of the appended figures which represent.

Figure 1:
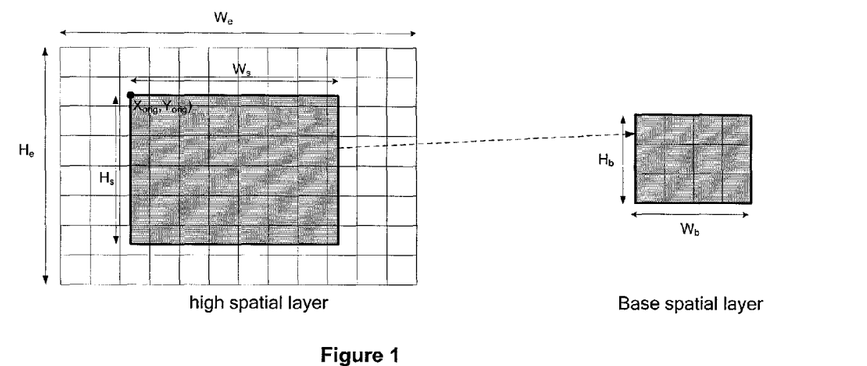
FIG. 1, geometrical relations between low and high spatial pictures.

In the sequel, two spatial layers are considered, a low layer (called base layer) corresponding to the images of low resolution and a high layer (called enhancement layer) corresponding to the images of high resolution. As represented in FIG. 1, width and height of enhancement layer images (i.e. high resolution images) are defined respectively by We and He. Base layer images (i.e. low resolution images) dimensions are defined by Wb and Hb. Low resolution images may be a downsampled version of sub-images of enhancement layer images, of dimensions Ws and Hs, positioned at coordinates $(X_{orig}, Y_{orig})$ in the enhancement layer images coordinates system. Low and high resolution images may also be provided by different cameras. In this case, the low resolution images are not obtained by downsampling high resolution images and geometrical parameters may be provided by external means (e.g. by the cameras themselves). The window corresponding to the scaled base layer is called a cropping window. A macroblock of the low resolution image corresponds to a macroblock of the high resolution image, if when superposing the low resolution image part upsampled by the inter-layer ratio in both directions with the high resolution image part, the corresponding macroblock covers at least partly said macroblock of the high resolution image. On borders of the enhancement layer image, macroblocks may either have no base layer corresponding macroblock, or be only partially covered by scaled base layer macroblocks.

For a given high layer macroblock that uses inter-layer prediction, the partitions, possibly sub-partitions, macroblock type and sub-macroblock types derivation process is based on the use of an array of 4×4 integers, called partInfo [x][y], with x=0 to 3 and y=0 to 3.

Figure 2:
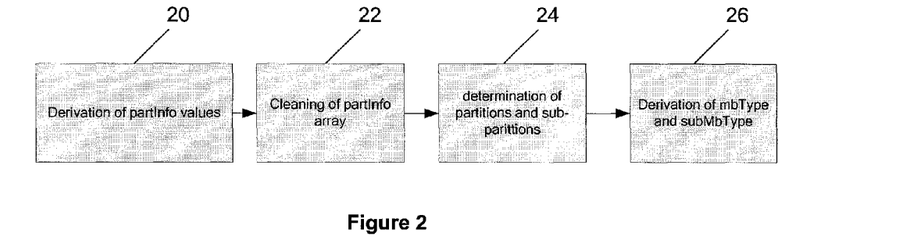
FIG. 2, a synoptic of macroblock partitioning, sub-partitioning, macroblock type and sub-macroblock types derivation process.

The process works in the following steps:
  at step 20, derivation of partInfo array values,
  at step 22, possibly cleaning of partInfo array,
  at step 24, determining partitions and possibly sub-partitions; and
  at step 26, derivation of macroblock type and sub-macroblock types.

These successive steps, represented in FIG. 2, are detailed hereafter.

Derivation of partInfo Values (Step 20)

Let (xM,yM) be the position of the upper left pixel of the said high layer macroblock in the high layer reference (with origin positioned at upper left pixel of the high layer picture).

According to the invention, the process comprises a step for identifying for each 4×4 block (x,y), x=0 to 3 and y=0 to 3 of the said high layer macroblock a corresponding macroblock mbBase in the base layer picture, i.e. identifying its address mbAddrBase. To this aim, let (Xin=4*x,Yin=4*y) be the input pixel position of this process, that will derive the corresponding base layer macroblock address, the base layer partition index of the said base layer macroblock, and the base layer sub-partition index of the said partition, comprising the corresponding pixel in base layer of pixel (Xin, Yin).

Let (xP,yP) be the so-called reference pixel of the 4×4 block of the said high layer macroblock defined as xP=Xin+d
yP=Yin+d where d is a predefined parameter set in the interval [0,3]. In a preferred implementation, d is set to 1.

The corresponding position (xB,yB) in the base layer is thus computed as follows:

xB=((xP+xM−Xorig)*Wb+Ws/2)/Ws
yB=((yP+yM−Yorig)*Hb+Hs/2)/Hs

The address mbAddrBase of the base layer macroblock mbBase comprising the pixel (xB,yB) is identified as follows:

mbAddrBase=(yB/16)*(Wb/16)+(xB/16)

If the said base layer macroblock mbBase does not exists (e.g. pixel (xB,yB) is outside the base layer picture limits), mbAddrBase is marked as not available. The interlayer prediction is forbidden for the high layer macroblock and the process is stopped.

The process comprises a step for identifying the partition (mbPartIdxBase) and subpartition (subMbPartIdxBase) of the corresponding 4×4 block mbBase. The partition (mbPartIdxBase) and subpartition (subMbPartIdxBase) are identified as follows:

mbPartIdxBase is set to the index of the partition of mbBase comprising pixel (xB,yB).
subMbPartIdxBase is derived as follows:
If mbBase is partitioned as 8×8 (divided in 4 8×8 blocks), subMbPartIdxBase is set to the index of the sub-partition of partition mbPartIdxBase of mbBase comprising pixel (xB,yB).
Otherwise, subMbPartIdxBase is set to 0.

Figure 3:
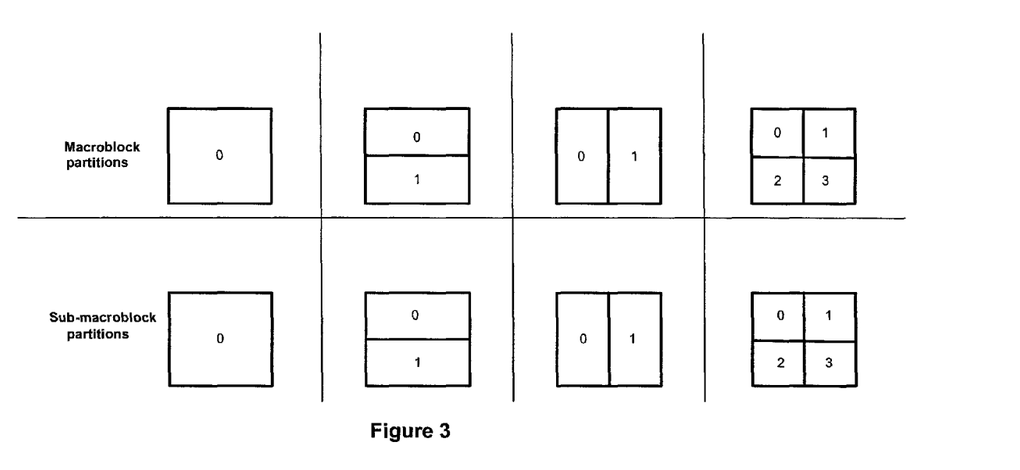
FIG. 3, possible partition and sub-partition indices.

The process of derivation of base macroblock, partition and sub-partition described above is applied with position (Xin=4*x,Yin=4*y) as input, to derive the base macroblock address mbAddrBase, the index mbPartIdxBase of the base layer partition and the index subMbPartIdxBase of the sub-partition, corresponding to the said 4×4 block. FIG. 3 gives the possible partition and sub-partition indices, depending on the macroblock partitioning, as defined in FIG. 6-9 of JSVM5. It relates for example to partitions of a macroblock of 16*16 luma samples and associated chroma samples and to partitions of a sub-macroblock of 8*8 luma samples and associated chroma samples.

The process comprises a step for deriving partInfo[x][y]. partInfo[x][y] is computed as follows:

If base macroblock of address mbAddrBase is INTRA coded
    partInfo[x][y]=−1 (that is, it is marked as inheriting from intra base macroblock), a negative value other than −1 may be used to identify that the block inherits from intra base macroblock
Otherwise
    partInfo[x][y]=16*mbAddrBase+4*mbPartIdxBase+subMbPartIdxBase.
    This formula is defined in order that one unique set (mbAddrBase, mbPartIdxBase, subMbPartIdxBase) generates one unique value of partInfo.
    From partInfo[x][y], mbAddrBase, mbPartIdxBase and subMbPartIdxBase can be uniquely identified as:
        mbAddrBase=partInfo[x][y]/16
        mbPartIdxBase=(partInfo[x][y] % 16)/4
        subMbPartIdxBase=(partInfo[x][y] % 16) % 4

Cleaning of partInfo Array (Step 22)

The following process is then applied to manage configurations in which some 4×4 blocks inherit from intra base macroblocks and other from inter base macroblocks. The process cleans the array partInfo by replacing any element partInfo[x][y] equal to −1 by one of its neighboring element. This cleaning process first applies on 4×4 blocks of each 8×8 block. Then 8×8 blocks are cleaned if necessary. The process is detailed in the sequel.

For each 8×8 block (X,Y), X=0 to 1 and Y=0 to 1, the following applies:

Cleaning of 4×4 Blocks

Figure 4:
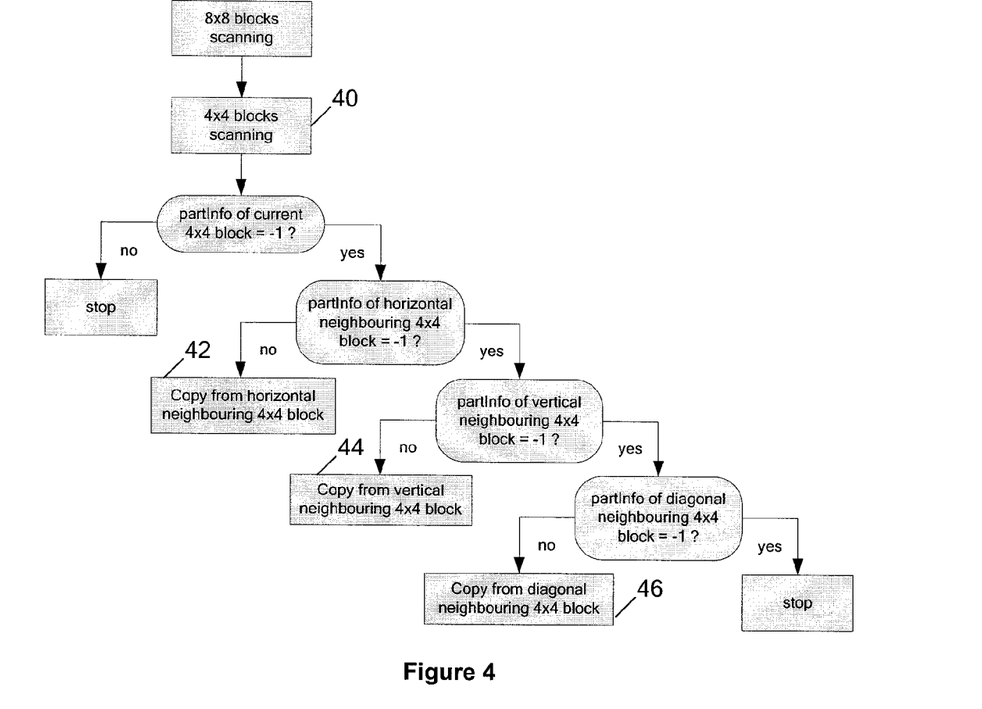
FIG. 4, synoptic of 4×4 blocks cleaning process.

The process synoptic is illustrated in FIG. 4. If partInfo value of a given 4×4 block is equal to −1, it is replaced by the partInfo value of one of its neighbouring 4×4 blocks belonging to the same 8×8 block, if this value is not equal to −1. The neighbouring 4×4 blocks are scanned in the following order: 1. horizontal neighbour, 2. vertical neighbour, 3. diagonal neighbour.

Pseudo-Code Description of this Process

At step 40, for each 4×4 block (x,y), x=0 to 1 and y=0 to 1, the following applies.
    If partInfo[2*X+x][2*Y+y] is equal to −1, the following applies.
        At step 42, if partInfo[2*X+1-x][2*Y+y] is not equal to −1, copy of horizontal neighbour:
            partInfo[2*X+x][2*Y+y]=partInfo[2*X+1−x][2*Y+y]
        Otherwise, at step 44, if partInfo[2*X+x][2*Y+1−y] is not equal to −1, copy of vertical neighbour:
            partInfo[2*X+x][2*y+y]=partInfo[2*X+x][2*Y+1-y]
        Otherwise, at step 46, if partInfo[2*X+1−x][2*Y+1−y] is not equal to −1, copy of diagonal neighbour:
            partInfo[2*X+x][2*Y+y]=partInfo[2*X+1-x][2*Y+1-y]

Cleaning of 8×8 Block

Figure 5:
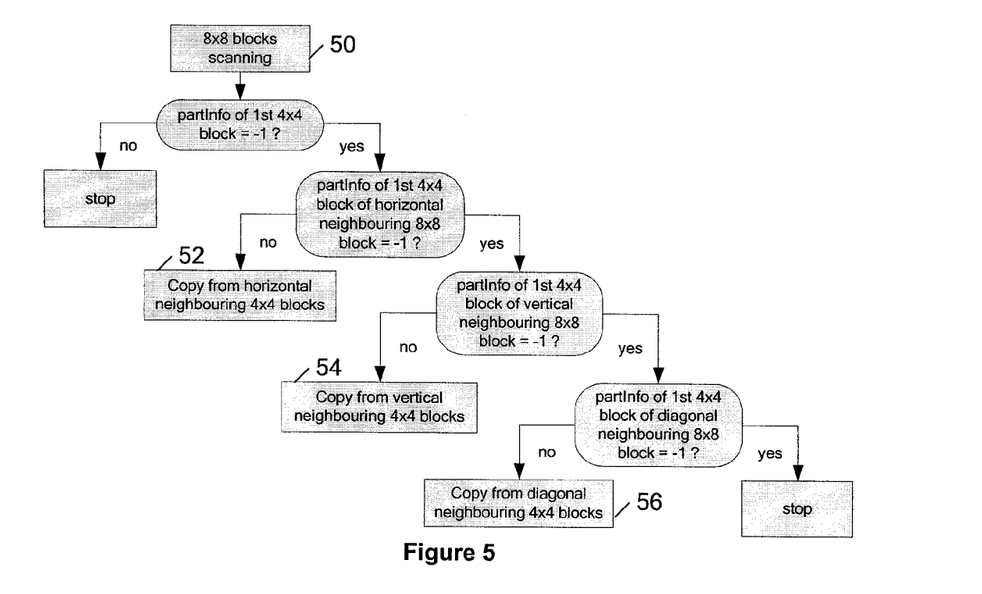
FIG. 5, synoptic of 8×8 blocks cleaning.

The process synoptic is illustrated in FIG. 5. For a given 8×8 block, if partInfo value of its first 4×4 block is equal to −1, partInfo values of its 4 4×4 blocks are replaced by those of a neighbouring 8×8 block belonging to the high layer macroblock. This replacement is only applied if the first 4×4 block of the considered neighbouring 8×8 block has a partInfo value not equal to −1. The neighbouring 8×8 blocks are scanned in the following order: 1. horizontal neighbour, 2. vertical neighbour, 3. diagonal neighbour.

Pseudo-Code Description of this Process

At step 50, for each 8×8 block (X,Y), X=0 to 1 and Y=0 to 1, the following applies.
    At step 52, if partInfo[2*X][2*Y] is equal to −1, the following applies.
        If partInfo[2*(1−X)][2*Y] is not equal to −1, copy of horizontal neighbour:
            For each 4×4 block (x,y), x=0 to 1 and y=0 to 1, the following applies.
                partInfo[2*X+x][2*y+y]=partInfo[2*(1−X)][2*Y]
        Otherwise, at step 54, if partInfo[2*X][2*(1−Y)] is not equal to −1, copy of vertical neighbour:
            For each 4×4 block (x,y), x=0 to 1 and y=0 to 1, the following applies.
                partInfo[2*X+x][2*y+y]=partInfo[2*X][2*(1−Y)]
        Otherwise, at step 56, if partInfo[2*(1−X)][2*(1−Y)] is not equal to −1, copy of diagonal neighbour:
            For each 4×4 block (x,y), x=0 to 1 and y=0 to 1, the following applies.
                partInfo[2*X+x][2*y+y]=partInfo[2*(1−X)][2*(1−Y)]

Derivation of Partitions, Sub-Partitions, Macroblock Type (mbType) and Sub-Macroblock Types (subMbType)

This process derives the high layer macroblock type mbtype and, if it is divided in 4 8×8 blocks, the sub-macroblock type subMbType[blkIdx] of each 8×8 block of index blkIdx, from the array partInfo and from the base layer macroblocks type (also called coding modes).

Available Base Layer Data

It is considered that each base layer macroblock contains an available information indicating for each of its 8×8 block which prediction list it uses. This information is stored as an bidimensional array usedPredList[mbAddr][blkIdx], the first dimension corresponding to the macroblock address mbAddr, the second dimension to the index of the 8×8 block inside the macroblock blkIdx (taking values between 0 and 3).

If 8×8 block of index blkIdx of macroblock of address mbAddr uses:

| | |
|---|---|
| prediction list L0 only, | usedPredList[ mbAddr][blkIdx] = 1. |
| prediction list L1 only, | usedPredList[ mbAddr][blkIdx] = 2. |
| both prediction lists L0 and L1, | usedPredList[ mbAddr][blkIdx] = 3. |

As specified in JSVM5, the macroblock type is defined among the values of Table 1. Similarly, as specified in JSVM5, the sub-macroblock type is defined among the values of Table 1.

TABLE 1 possible macroblock and sub-macroblock types.

macroblock type

| | |
|---|---|
| B_L0_16×16 | B_L1_Bi_16×8 |
| B_L1_16×16 | B_L1_Bi_8×16 |
| B_Bi_16×16 | B_Bi_L0_16×8 |
| B_L0_L0_16×8 | B_Bi_L0_8×16 |
| B_L0_L0_8×16 | B_Bi_L1_16×8 |
| B_L1_L1_16×8 | B_Bi_L1_8×16 |
| B_L1_L1_8×16 | B_Bi_Bi_16×8 |
| B_L0_L1_16×8 | B_Bi_Bi_8×16 |
| B_L0_L1_8×16 | B_8×8 |
| B_L1_L0_16×8 | P_L0_16×16 |
| B_L1_L0_8×16 | P_L0_L0_16×8 |
| B_L0_Bi_16×8 | P_L0_L0_8×16 |
| B_L0_Bi_8×16 | P_8×8 | sub-macroblock type

| | |
|---|---|
| B_L0_8×8 | B_Bi_4×8 |
| B_L1_8×8 | B_L0_4×4 |
| B_Bi_8×8 | B_L1_4×4 |
| B_L0_8×4 | B_Bi_4×4 |
| B_L1_8×4 | P_L0_8×8 |
| B_Bi_8×4 | P_L0_8×4 |
| B_L0_4×8 | P_L0_4×8 |
| B_L1_4×8 | P_L0_4×4 |

Process Description

The derivation process for macroblock type mbtype and, if applicable, sub-macroblock type subMbType[blkIdx] of each 8×8 block of index blkIdx, works as follows.

Partition Determination and mbType Derivation

Figure 6:
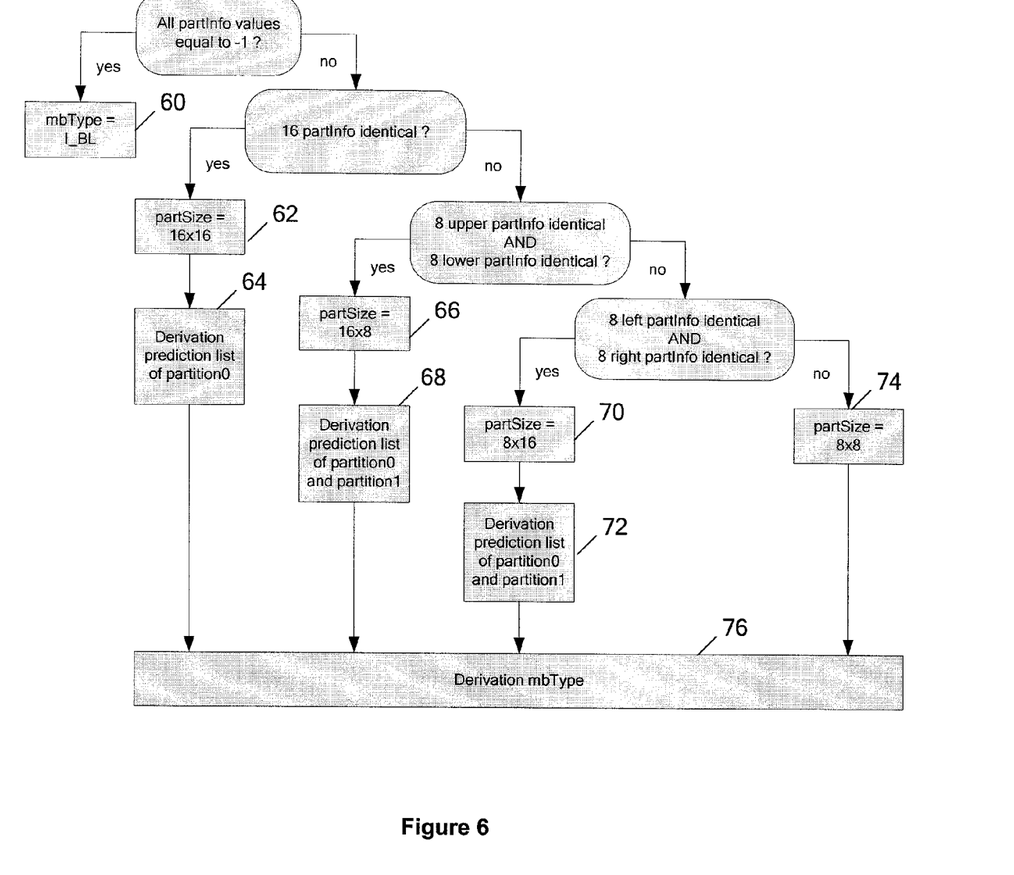
FIG. 6, synoptic of macroblock partitioning and mbType derivation process.

The process synoptic is illustrated in FIG. 6.

At step 60, if all partInfo values are equal to −1, mbtype is set to I_BL mode.

Otherwise, the partitioning is determined depending on the analysis of partInfo values.

If all 16 partInfo values are equal,
    At step 62, partitioning partSize is set to 16×16
    At step 64, prediction list information derivation
        partPredMode0=usePredList[partInfo[0][0]/16]
        [((partInfo[0][0]%16)/4)].
Otherwise if the 8 upper partInfo values are equal and the 8 down partInfo values are equal,
    At step 66, partitioning partSize is set to 16×8
    At step 68, prediction list information derivation of up 16×8 partition:
        partPredMode0=usePredList[partInfo[0][0]/16]
        [((partInfo[0][0]%16)/4)].
    At step 68, prediction list information derivation of down 16×8 partition:
        partPredMode1=usePredList[partInfo[3][3]/16]
        [((partInfo[3][3]%16)/4)].
Otherwise if the 8 left partInfo values are equal and the 8 right partInfo values are equal,
    At step 70, partitioning partSize is set to 8×16
    At step 72, prediction list information derivation of left 8×16 partition:
        partPredMode0=usePredList[partInfo[0][0]/16]
        [((partInfo[0][0]%16)/4)].
    At step 72, prediction list information derivation of right 8×16 partition:
        partPredMode1=usePredList[partInfo[3][3]/16]
        [((partInfo[3][3]%16)/4)].
Otherwise,
    At step 74, partitioning partSize is set to 8×8

Finally, the mbtype is derived, at step 76, based on the partitioning partSize, the derived prediction list information partPredMode0 and partPredMode1 and the type of the slice slice_type comprising the high layer macroblock under consideration, using Table 2.

TABLE 2 derivation of macroblock type mbType ('na' means not available).

| slice_type | partSize | partPredMode0 | partPredMode1 | mbType |
|---|---|---|---|---|
| B | 16×16 | <2 | na | B_L0_16×16 |
| B | 16×16 | 2 | na | B_L1_16×16 |
| B | 16×16 | 3 | na | B_Bi_16×16 |
| B | 16×8 | <2 | <2 | B_L0_L0_16×8 |
| B | 8×16 | <2 | <2 | B_L0_L0_8×16 |
| B | 16×8 | 2 | 2 | B_L1_L1_16×8 |
| B | 8×16 | 2 | 2 | B_L1_L1_8×16 |
| B | 16×8 | <2 | 2 | B_L0_L1_16×8 |
| B | 8×16 | <2 | 2 | B_L0_L1_8×16 |
| B | 16×8 | 2 | <2 | B_L1_L0_16×8 |
| B | 8×16 | 2 | <2 | B_L1_L0_8×16 |
| B | 16×8 | <2 | 3 | B_L0_Bi_16×8 |
| B | 8×16 | <2 | 3 | B_L0_Bi_8×16 |
| B | 16×8 | 2 | 3 | B_L1_Bi_16×8 |
| B | 8×16 | 2 | 3 | B_L1_Bi_8×16 |
| B | 16×8 | 3 | <2 | B_Bi_L0_16×8 |
| B | 8×16 | 3 | <2 | B_Bi_L0_8×16 |
| B | 16×8 | 3 | 2 | B_Bi_L1_16×8 |
| B | 8×16 | 3 | 2 | B_Bi_L1_8×16 |
| B | 16×8 | 3 | 3 | B_Bi_Bi_16×8 |
| B | 8×16 | 3 | 3 | B_Bi_Bi_8×16 |
| B | 8×8 | na | na | B_8×8 |
| P | 16×16 | na | na | P_L0_16×16 |
| P | 16×8 | na | na | P_L0_L0_16×8 |
| P | 8×16 | na | na | P_L0_L0_8×16 |
| P | 8×8 | na | na | P_8×8 |

Pseudo-Code Description of this Process

If partInfo[0][0] is equal to −1, mbType is set equal to I_BL.

Otherwise, the following applies.
Let partSize, partPredMode0, and partPredMode1 be temporary variables that are derived as follows.
If partInfo[x, y], with x, y=0 . . . 3, is equal to partInfo [0, 0], the following applies
partSize=16×16
partPredMode0=usedPredictionLists [partInfo[0, 0]/16][(partInfo[0,0] % 16)/4]
Otherwise, if partInfo[x, y], with x=0 . . . 3 and y=0 . . . 1, is equal to partInfo[0, 0] and partInfo[x, y], with x=0 . . . 3 and y=2 . . . 3, is equal to partInfo[0, 2], the following applies.
partSize=16×8
partPredMode0=usedPredictionLists [partInfo[0, 0]/16][(partInfo[0,0] % 16)/4]
partPredMode1=2*predFlagL1Base[partInfo[3, 3]/16][(partInfo[3, 3] % 16)/4]
Otherwise, if partInfo[x, y], with x=0 . . . 1 and y=0 . . . 3, is equal to partInfo[0, 0] and partInfo[x, y], with x=2 . . . 3 and y=0 . . . 3, is equal to partInfo[2, 0], the following applies
partSize=8×16
partPredMode0=usedPredictionLists [partInfo[0,0]/16][(partInfo[0] % 16)/4]
partPredMode1=usedPredictionLists [partInfo[3, 3]/16][(partInfo[3, 3] % 16)/4]
Otherwise, partSize is set equal to 8×8.
Depending on slice_type, partSize, partPredMode0, and partPredMode1, mbType is derived as specified by Table 2.

Figure 7:
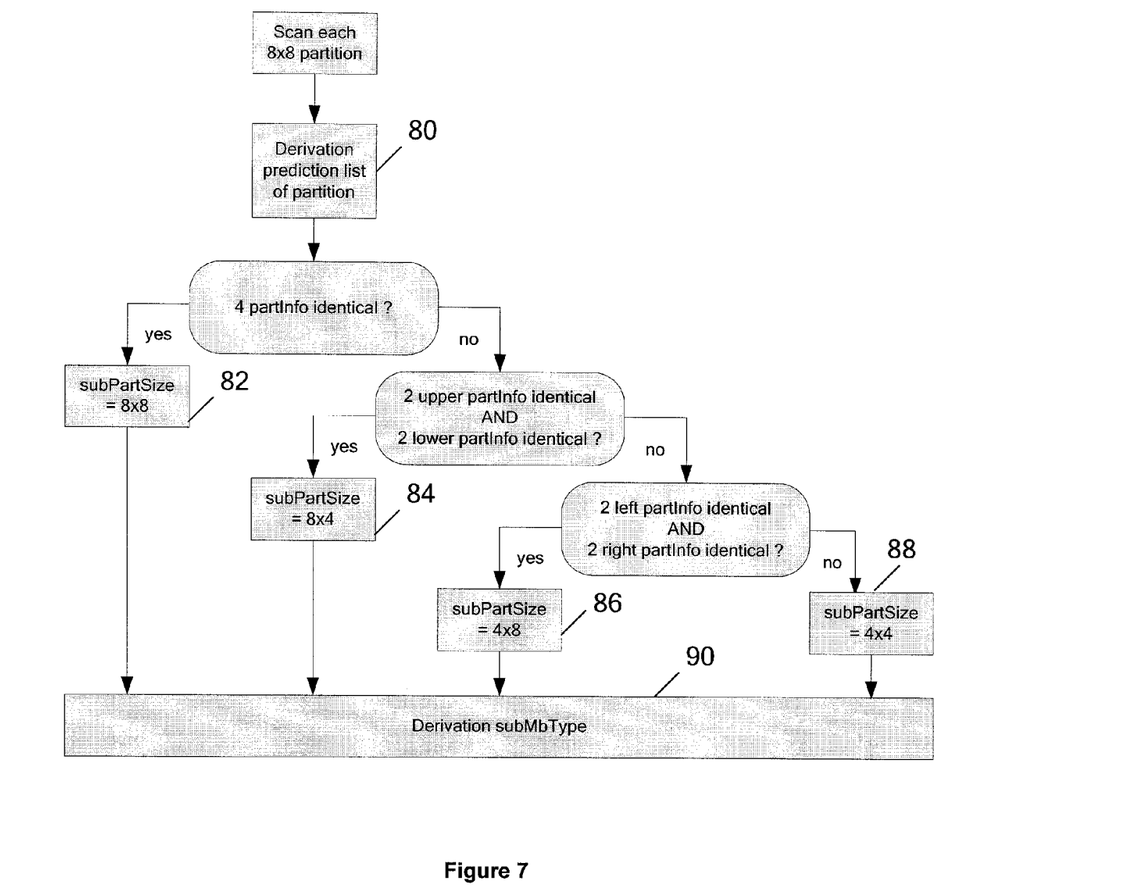
FIG. 7, synoptic of sub-partitioning and subMbTypes derivation process.

Sub-Partitions Determination and subMbTypes Derivation
If mbtype is equal to P_8×8 or B_8×8, sub-macroblock type of each 8×8 block is determined. as follows.
The process synoptic is illustrated in FIG. 7.
For each 8×8 block (x0,y0) with x0,y0=0, . . . , 1, the sub-partitioning is determined depending on the analysis of partInfo values.
At step 80, prediction list information derivation:
partPredMode=usedPredictionLists [partInfo[x0, y0]/16][(partInfo[x0,y0]% 16)/4].
At step 82, if 4 partInfo values of considered 8×8 block are equal, sub-partitioning subPartSize is set to 8×8
Otherwise, at step 84, if 2 upper partInfo values of considered 8×8 block are equal and 2 lower partInfo values of considered 8×8 block are equal, sub-partitioning subPartSize is set to 8×4
Otherwise, at step 86, if 2 left partInfo values of considered 8×8 block are equal and 2 right partInfo values of considered 8×8 block are equal, sub-partitioning subPartSize is set to 4×8
Otherwise, at step 88, sub-partitioning subPartSize is set to 4×4
Finally, the subMbType of the considered 8×8 block is derived, at step 90, based on the sub-partitioning subPartSize, the derived prediction list information partPredMode and the type of the slice slice_type comprising the high layer macroblock under consideration, using Table 3.

TABLE 3 derivation of sub-macroblock type subMbType ('na' means not available).

| slice_type | subPartSize | partPredMode | subMbType |
|---|---|---|---|
| B | 8×8 | <2 | B_L0_8×8 |
| B | 8×8 | 2 | B_L1_8×8 |

TABLE 3-continued derivation of sub-macroblock type subMbType ('na' means not available).

| slice_type | subPartSize | partPredMode | subMbType |
|---|---|---|---|
| B | 8×8 | 3 | B_Bi_8×8 |
| B | 8×4 | <2 | B_L0_8×4 |
| B | 8×4 | 2 | B_L1_8×4 |
| B | 8×4 | 3 | B_Bi_8×4 |
| B | 4×8 | <2 | B_L0_4×8 |
| B | 4×8 | 2 | B_L1_4×8 |
| B | 4×8 | 3 | B_Bi_4×8 |
| B | 4×4 | <2 | B_L0_4×4 |
| B | 4×4 | 2 | B_L1_4×4 |
| B | 4×4 | 3 | B_Bi_4×4 |
| P | 8×8 | na | P_L0_8×8 |
| P | 8×4 | na | P_L0_8×4 |
| P | 4×8 | na | P_L0_4×8 |
| P | 4×4 | na | P_L0_4×4 |

Pseudo-Code Description of this Process
When mbType is equal to P_8×8 or B_8×8, for mbPartIdx=0 . . . 3, derivation of subMbType for each partition is achieved as follows.
Let x0, y0, and partPredMode be temporary variables that are derived by $$x0 = 2^*(mbPartIdx \% 2)$$

$$y0 = 2^*(mbPartIdx/2)$$

$$partPredMode = usedPredictionLists$$

$$[partInfo[x0, y0]/16][(partInfo[x0, y0] \% 16)/4]$$

Let subPartSize be a temporary variable that is derived as follows.
If partInfo[x0+x, y0+y], with x, y=0 . . . 1, is equal to partInfo[x0, y0], subPartSize is set equal to 8×8.
Otherwise, if partInfo[x0, y0] is equal to partInfo[x0+1, y0] and partInfo[x0, y0+1] is equal to partInfo[x0+1, y0+1], subPartSize is set equal to 8×4.
Otherwise, if partInfo[x0, y0] is equal to partInfo[x0, y0+1] and partInfo[x0+1, y0] is equal to partInfo[x0+1, y0+1], subPartSize is set equal to 4×8.
Otherwise, subPartSize is set equal to 4×4.
Depending on slice_type, subPartSize, partPredMode, subMbType[mbPartIdx] is derived as specified by Table 3

The invention claimed is:
1. Method, as part of a scalable video coding method in a scalable video coder or of a scalable decoding method in a scalable video decoder, for determining for a high layer macroblock that uses inter-layer prediction a partitioning of said macroblock in partitions comprising the following steps:
In the scalable video coder or in the scalable video decoder, dividing said high layer macroblock in non-overlapping high layer blocks of a predefined size;
determining a corresponding base layer pixel for one pixel, called reference pixel, of each high layer block;
identifying, for each reference pixel, a base layer macroblock to which said corresponding base layer pixel belongs, a base layer partition to which said corresponding base layer pixel belongs in said identified base layer macroblock, a base layer sub-partition to which said corresponding base layer pixel belongs in said identified base layer partition if said base layer sub-partition exists;

deriving, for each of said high layer block, a single value, called PartInfo value, as follows:
　　setting PartInfo value to a predefined negative value if said identified base layer macroblock is INTRA coded; and
　　computing said PartInfo value on the basis of the identified base layer macroblock, identified base layer partition and identified base layer sub-partition if said sub-partition exists, otherwise; and
determining a partitioning of said high layer macroblock in macroblock partitions by comparing between them said PartInfo values associated with each of said high layer blocks.

2. Method according to claim 1, wherein said base layer macroblock is identified by its address mbAddrBase in the image, said base layer partition is identified in said base layer macroblock by an index mbPartIdxBase, and wherein said base layer sub-partition is identified in said base layer partition by an index subMbPartIdxBase.

3. Method according to claim 2, wherein said PartInfo value is computed according to the following equation: 16*mbAddrBase+4* mbPartIdxBase+subMbPartIdxBase.

4. Method according to claim 1, wherein the method further comprises after the step for deriving the PartInfo value, a step for setting each PartInfo value associated to a given high layer block and equal to said predefined negative value to a PartInfo value not equal to said predefined negative value and associated with one of the high layer blocks neighbor of said given high layer block, if such a PartInfo value exists.

5. Method according to claim 1, wherein said high layer macroblock is of size 16 by 16 pixels and wherein said high layer blocks are of size 4 by 4 pixels.

6. Method according to claim 5, wherein:
　if the PartInfo values associated with each high layer block are all equal to a same value, then said high layer macroblock is partitioned in a partition of 16 pixels width and 16 pixels height;
　if the PartInfo values associated with the 8 high layer blocks of the upper part of said high layer macroblock are all equal to a same first value and if the PartInfo values associated with the 8 high layer blocks of the lower part of said high layer macroblock are all equal to a same second value different from said first value, then said high layer macroblock is partitioned in two partitions of 16 pixels width and 8 pixels height; and
　if the PartInfo values associated with the 8 high layer blocks of the left part of said high layer macroblock are all equal to a same third value and if the PartInfo values associated with the 8 high layer blocks of the right part of said high layer macroblock are all equal to a same fourth value different from said third value, then said high layer macroblock is partitioned in two partitions of 8 pixels width and 16 pixels height; and
otherwise said high layer macroblock is partitioned in four partitions of 8 pixels width and 8 pixels height.

7. Method according to claim 6, wherein if said high layer macroblock is partitioned in 4 partitions of 8 pixels width and 8 pixels height, the method further comprises a step for determining, for each partition of said high layer macroblock, a partitioning in sub-partitions by comparing between them said PartInfo values associated with each of said high layer blocks that belong to said partition.

8. Method according to claim 1, wherein said reference pixel is the top left pixel of said high layer block.

* * * * *